United States Patent
Nagao et al.

(10) Patent No.: US 7,365,926 B2
(45) Date of Patent: Apr. 29, 2008

(54) SIGNAL PROCESSING METHOD OF MAGNETIC RECORDING MEDIUM AND MAGNETIC RECORD REPRODUCTION APPARATUS

(75) Inventors: Makoto Nagao, Odawara (JP); Tadashi Yasunaga, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 330 days.

(21) Appl. No.: 11/229,612

(22) Filed: Sep. 20, 2005

(65) Prior Publication Data
US 2006/0061897 A1    Mar. 23, 2006

(30) Foreign Application Priority Data
Sep. 21, 2004    (JP)  ............................. 2004-273493

(51) Int. Cl.
*G11B 5/86*    (2006.01)
*G11B 21/02*   (2006.01)

(52) U.S. Cl. .............................. 360/17; 360/39; 360/75

(58) Field of Classification Search .................... None
See application file for complete search history.

(56) References Cited

U.S. PATENT DOCUMENTS

| | | |
|---|---|---|
| 6,704,156 B1 | 3/2004 | Baker et al. |
| 6,876,506 B1 * | 4/2005 | Wakabayashi et al. ........ 360/48 |
| 6,909,563 B2 | 6/2005 | Nishikawa et al. |
| 6,999,259 B2 * | 2/2006 | Yoshimura .................... 360/48 |
| 7,149,042 B2 | 12/2006 | Nishikawa et al. |
| 2002/0044368 A1 | 4/2002 | Yoshizawa |
| 2004/0160694 A1 | 8/2004 | Yoshimura |
| 2005/0213236 A1 * | 9/2005 | Nishikawa et al. ........... 360/17 |

FOREIGN PATENT DOCUMENTS

| | | |
|---|---|---|
| JP | 05-298840 | 11/1993 |
| JP | 10-40544 A | 2/1998 |
| JP | 10-269566 A | 10/1998 |
| JP | 2002-42301 A | 2/2002 |
| JP | 2003-030940 | 1/2003 |
| JP | 2003-173516 A | 6/2003 |

OTHER PUBLICATIONS

European Search Report dated May 7, 2007.

* cited by examiner

*Primary Examiner*—Craig A. Renner
*Assistant Examiner*—Varsha A. Kapadia
(74) *Attorney, Agent, or Firm*—Sughrue Mion, PLLC

(57) ABSTRACT

When signals are read out by a magnetic head from a magnetic recording medium on which magnetic bits corresponding to information are recorded along the tracks thereof by a magnetic transfer method, if a space which is longer than or equal to a length corresponding to three bits is present between consecutive magnetic bits, readout of signals from a sub-pulse generation area in the space is cancelled in readout of the magnetic bits by the magnetic head along the tracks. The signals are not read out at all, or even if the signals are read out, they are not processed as valid signals.

20 Claims, 5 Drawing Sheets

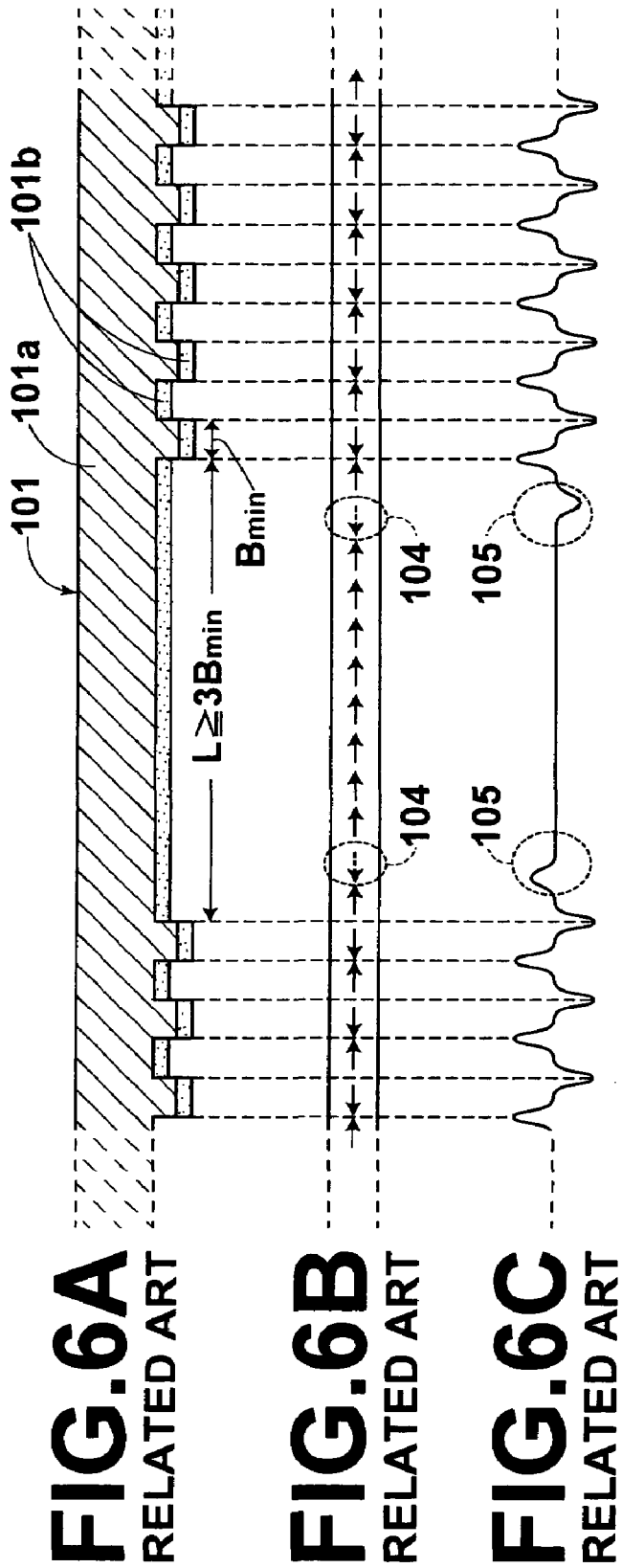

SIGNAL PROCESSING METHOD OF MAGNETIC RECORDING MEDIUM AND MAGNETIC RECORD REPRODUCTION APPARATUS

BACKGROUND OF THE INVENTION

1. Field of the Invention

The present invention relates to a signal processing method in readout of signals from a magnetic recording medium, on which magnetic bits are recorded along the tracks thereof by using a magnetic transfer method. The present invention also relates to a magnetic record reproduction apparatus.

2. Description of the Related Art

Conventionally, a magnetic transfer method for transferring magnetized patterns corresponding to information carried by a master information carrier for magnetic transfer onto a magnetic recording medium (slave medium) is well known. In this method, the master information carrier for magnetic transfer, which carries the information to be transferred, represented by very fine uneven patterns, and the magnetic recording medium are placed in close contact with each other, and a magnetic field for transfer is applied to the master information carrier for magnetic transfer and the magnetic recording medium which are in close contact with each other. In this magnetic transfer method, recording may be performed statically without changing relative positions between the master information carrier and the magnetic recording medium. Further, the magnetic transfer method has an advantage that the information can be recorded in a very short time (for example, please refer to Japanese Unexamined Patent Publication No. 10(1998)-040544 and Japanese Unexamined Patent Publication No. 10(1998)-269566).

Application of this magnetic transfer technique to recording of servo signals for positioning a magnetic head on a magnetic recording medium has been already proposed in Japanese Unexamined Patent Publication No. 10(1998)-040544, Japanese Unexamined Patent Publication No. 10(1998)-269566, or the like.

However, the magnetic transfer method has a technical problem that when signals are transferred onto the magnetic recording medium from the master information carrier, an unclear magnetic recording area (reversely magnetized area) is produced on the magnetic recording medium. Since the unclear magnetic recording area is present on the magnetic recording medium, a sub-pulse is detected in a readout waveform of magnetized patterns. Therefore, there is a possibility that the sub-pulse is recognized as a reproduced signal by a magnetic reproduction apparatus, which may cause an error in reproduction of the signals. A method for observing the sub-pulse, generated in the unclear magnetic recording area, is disclosed in U.S. Patent Application Publication No. 20020044368, Japanese Unexamined Patent Publication No. 2002-042301, or the like.

When transferred signals are, for example, servo signals, if a space exceeding a length corresponding to three bits, in which magnetic bits are not recorded, is present on the magnetic recording medium after magnetic transfer, it is difficult to completely prevent generation of a sub-pulse caused by the unclear magnetic recording area. When the sub-pulse is present, tracking performance drops. An example will be described with reference to schematic diagrams illustrated in FIGS. 6A through 6C.

FIG. 6A is a schematic diagram illustrating a partial sectional view of a master information carrier in the track direction. FIG. 6B is a schematic diagram illustrating magnetized patterns on a corresponding portion of a magnetic recording medium, onto which magnetized patterns are transferred from the master information carrier illustrated in FIG. 6A. FIG. 6C is a schematic diagram illustrating a readout waveform which is detected from the magnetized patterns.

Uneven patterns based on desired information are formed on a master information carrier 101. The uneven patterns include protrusions and depressions which have various bit lengths. If the minimum bit length (length in the track direction) among the various bit lengths is Bmin, many spaces (depressions), each having a length L which is longer than or equal to a length corresponding to three bits, namely $L \geq 3Bmin$, are present. The master information carrier 101 includes a substrate 101a made of a magnetic material such as Ni, for example. The substrate 101a bears uneven patterns based on desired information on the surface thereof. The master information carrier 101 for magnetic transfer also includes a magnetic layer 101b which is formed on the surface of the uneven patterns of the substrate 101a. The surface of the master information carrier 101 for magnetic transfer, on which the magnetic layer 101b is formed, and a magnetic recording layer of the magnetic recording medium, on which direct current magnetization has been carried out in advance in a single direction along the track, are placed in close contact with each other. While they are in close contact with each other, a magnetic field for transfer is applied in a direction opposite to that of the direct current magnetization. Accordingly, the magnetized patterns as illustrated in FIG. 6B are recorded on the magnetic recording medium. At this time, unclear magnetic recording areas 104 are generated at both ends of an area corresponding to a space which has the aforementioned length L. Further, a readout waveform as illustrated in FIG. 6C is detected from the magnetized patterns illustrated in FIG. 6B. As illustrated in FIG. 6C, sub-pulses 105 which correspond to the unclear magnetic recording areas 104 are detected. Specifically, the sub-pulses are detected at a reproduction apparatus for reproducing data from information recorded on a magnetic recording media. Therefore, there is a possibility that the sub-pulses are incorrectly recognized as reproduced signals. For example, when sub-pulses are generated at both ends of space portions of burst signals in servo patterns, the timing of the beginning and end of the servo signal area is incorrectly recognized. Therefore, the servo timing is shifted, and there is a possibility that an error such as failure in servo tracking is caused.

SUMMARY OF THE INVENTION

In view of the foregoing circumstances, it is an object of the present invention to provide a signal processing method of a magnetic recording medium so that sub-pulses are not incorrectly recognized during reproduction of signals when the signals are read out from the magnetic recording medium on which the signals are recorded by magnetic transfer. It is another object of the present invention to provide a magnetic record reproduction apparatus in which the signal processing method as described above is used.

A signal processing method according to the present invention is a signal processing method of a magnetic recording medium in readout of signals by a magnetic head from the magnetic recording medium on which magnetic bits corresponding to information are recorded along the tracks thereof by using a magnetic transfer method, wherein if a space which is longer than or equal to a length corresponding to three bits is present between consecutive magnetic bits, readout of signals from a sub-pulse generation area in the space is cancelled in readout of the magnetic bits along the tracks by the magnetic head.

The expression "readout of signals is cancelled" refers to not reading out the signals. Alternatively, the expression refers to not processing the signals as valid signals even if the signals are read out, in other words, not recognizing the signals as reproduced signals.

It is particularly preferable that readout of signals from an area corresponding to a first half or one bit of the space and/or a last half or one bit of the space is cancelled. This readout method is preferable when the sub-pulse generation area, namely signal cancellation area, is an area corresponding to a first half or one bit of the space and/or a last half or one bit of the space.

Further, it is preferable that the information recorded on the magnetic recording medium is a burst bit signal which is used in amplitude servo tracking.

Further, a magnetic record reproduction apparatus according to the present invention is a magnetic record reproduction apparatus comprising:

a servo tracking means which performs servo tracking on a magnetic recording medium by using a signal processing method according to the present invention.

When servo tracking is performed, it is preferable to use a recording medium on which signals are magnetically transferred from a master information carrier for magnetic transfer, on which bit elements having rounded portions at both ends thereof with respect to the width direction of the track are formed along the track.

It is preferable to use a magnetic recording medium, wherein the magnetic bits recorded along the tracks are burst signals which are used in amplitude servo tracking, and wherein the burst signals are recorded so that the ends of the burst signals with respect to the width direction of the track, which are adjacent to each other with respect to the direction of the track, overlap with each other.

Further, it is preferable to use a magnetic recording medium, wherein the magnetic bits recorded along the tracks are burst signals which are used in amplitude servo tracking, and wherein the burst signals which are adjacent to each other with respect to the width direction of the track are recorded so that the phases of the magnetic bits thereof are shifted from each other.

As an example of the "master information carrier for magnetic transfer", there is a master information carrier including only a substrate made of a magnetic material, which bears uneven patterns on the surface thereof. There is also a master information carrier which includes a substrate bearing uneven patterns on the surface thereof and a magnetic layer which is laid at least on the upper surfaces of the protrusions of the substrate. There is also a master information carrier which includes a flat substrate and a magnetic layer bearing uneven patterns on the surface thereof, which is formed on the flat substrate, or the like. Here, the master information carrier for magnetic transfer may be a master information carrier which includes a substrate bearing uneven patterns formed on the surface thereof and a magnetic layer with which the depressions of the substrate are filled. Specifically, the master information carrier for magnetic transfer may be not only a master information carrier which bears uneven patterns on the surface thereof but also a master information carrier which has a flat surface formed by filling the depressions with the magnetic layer. In the master information carrier which has the substrate bearing uneven patterns on the surface thereof and the magnetic layer with which the depressions of the substrate are filled, the protrusions and depressions function in an opposite manner to those of the master information carrier which has uneven patterns on the surface thereof. The magnetic layer with which the depressions of the substrate are filled corresponds to the protrusions of the uneven patterns, and the protrusions of the substrate correspond to the depressions of the uneven patterns.

When tracks are scanned by the magnetic head, it is difficult to detect a space which is longer than or equal to a length corresponding to three bits and control readout of signals by a reproduction head of the magnetic head at the same time. Therefore, a means for detecting a space which is longer than or equal to a length corresponding to three bits may be provided. For example, when servo patterns are recorded on a magnetic recording medium, the arrangement of magnetic bits recorded thereon is known. Therefore, a sub-pulse generation area may be judged based on recognition that a next space which is longer than or equal to a length corresponding to three bits will be present according to readout of the signals, and readout of the signals from the sub-pulse generation area by the magnetic head may be cancelled.

In the signal processing method according to the present invention, when signal are read out by a magnetic head from a magnetic recording medium on which magnetic bits corresponding to information are recorded along the tracks thereof by using a magnetic transfer method, if a space which is longer than or equal to a length corresponding to three bits is present between consecutive magnetic bits, readout of signal in a sub-pulse generation area in the space is cancelled. Therefore, even if an unclear magnetic recording area is generated in the magnetic recording medium during magnetic transfer, a sub-pulse caused by generation of the unclear magnetic recording area is not detected during reproduction of signals. Therefore, incorrect recognition of the signals can be prevented.

In the magnetic record reproduction apparatus according to the present invention, signal processing is performed so that readout of signals from a sub-pulse generation area is cancelled. Therefore, a sub-pulse is not detected during reproduction of signals, and incorrect recognition of signals can be prevented. Accordingly, the servo signals or the like are detected without incorrect recognition, and it is possible to accurately perform servo tracking.

Further, if signals are transferred onto a magnetic recording medium from a master information carrier on which bit elements having rounded portions at ends thereof with respect to the width direction of the track are formed, magnetic bits which have uniform edge qualities can be produced on the magnetic recording medium.

Further, if a magnetic recording medium on which burst signals for amplitude servo tracking are recorded so that the ends of the burst signals with respect to the width direction of the track, which are adjacent to each other with respect to the direction of the track, overlap with each other, recording areas of the magnetic bits in each track can be increased. Further, even if recorded information is blurred, or demagnetization of record or the like occurs at an end of a recording area of each bit with respect to the width direction of the track, it is possible to reduce the influence from the blur, demagnetization of record, or the like. Hence, it is possible to prevent a drop in the accuracy of position servo tracking.

Further, a magnetic recording medium onto which information is transferred from a master information carrier on which burst signals for amplitude servo tracking are recorded may be used. The burst signals may be recorded so that the phases of the burst signals which are adjacent to each other with respect to the width direction of the track are shifted from each other. If the magnetic recording medium as described above is used, magnetic fields from the burst signals, which are adjacent to each other with respect to the width direction of the track, spread in a non-signal space therebetween only slightly during magnetic transfer. Therefore, it is possible to reduce noise signals which are magnetically recorded in the non-signal space area, and tracking can be performed accurately based on detected low-noise burst signals.

BRIEF DESCRIPTION OF THE DRAWINGS

FIG. 6A is a schematic diagram for explaining problems in the related art;

FIG. 6B is a schematic diagram for explaining problems in the related art; and

FIG. 6C is a schematic diagram for explaining problems in the related art.

DESCRIPTION OF THE PREFERRED EMBODIMENTS

Hereinafter, an embodiment of the present invention will be described with reference to attached drawings. In this embodiment, amplitude servo signals are recorded on a magnetic recording medium.

Figure 1:
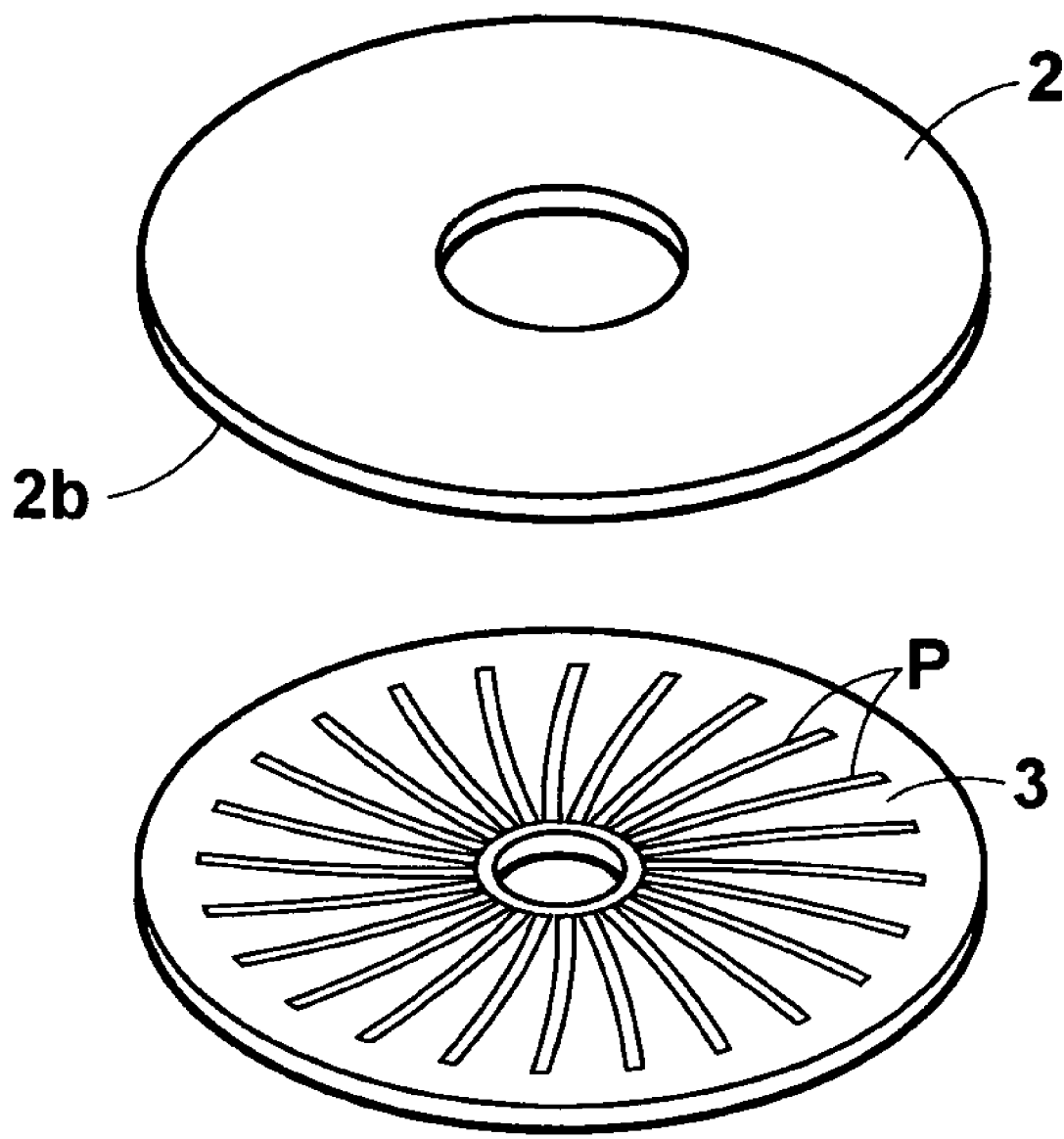
FIG. 1 is a perspective view of a master information carrier for magnetic transfer and a magnetic recording medium according an embodiment of the present invention.

FIG. 1 is a perspective view illustrating a magnetic recording medium 2 which is used in a signal processing method according to the present invention and a master information carrier 3 for magnetic transfer, from which signals are magnetically transferred onto the magnetic recording medium 2 to be recorded thereon. The magnetic recording medium 2 is, for example, a disk-shaped magnetic recording medium such as a hard disk or flexible disk, on which a magnetic recording layer or layers are formed on one side or both sides thereof. In this embodiment, a magnetic recording medium 2 which has a recording surface 2b on one side of a disk-shaped substrate 21 thereof is illustrated. An in-plane magnetic recording layer 22 is formed in the magnetic recording medium 2 (please refer to FIG. 4).

Further, a servo area P in which very fine uneven patterns corresponding to servo signals are formed is provided on a surface of the master information carrier 3. Approximately 60 through 200 servo areas P are generally provided in a track.

Figures 2A, 2B, 2C, 2D:
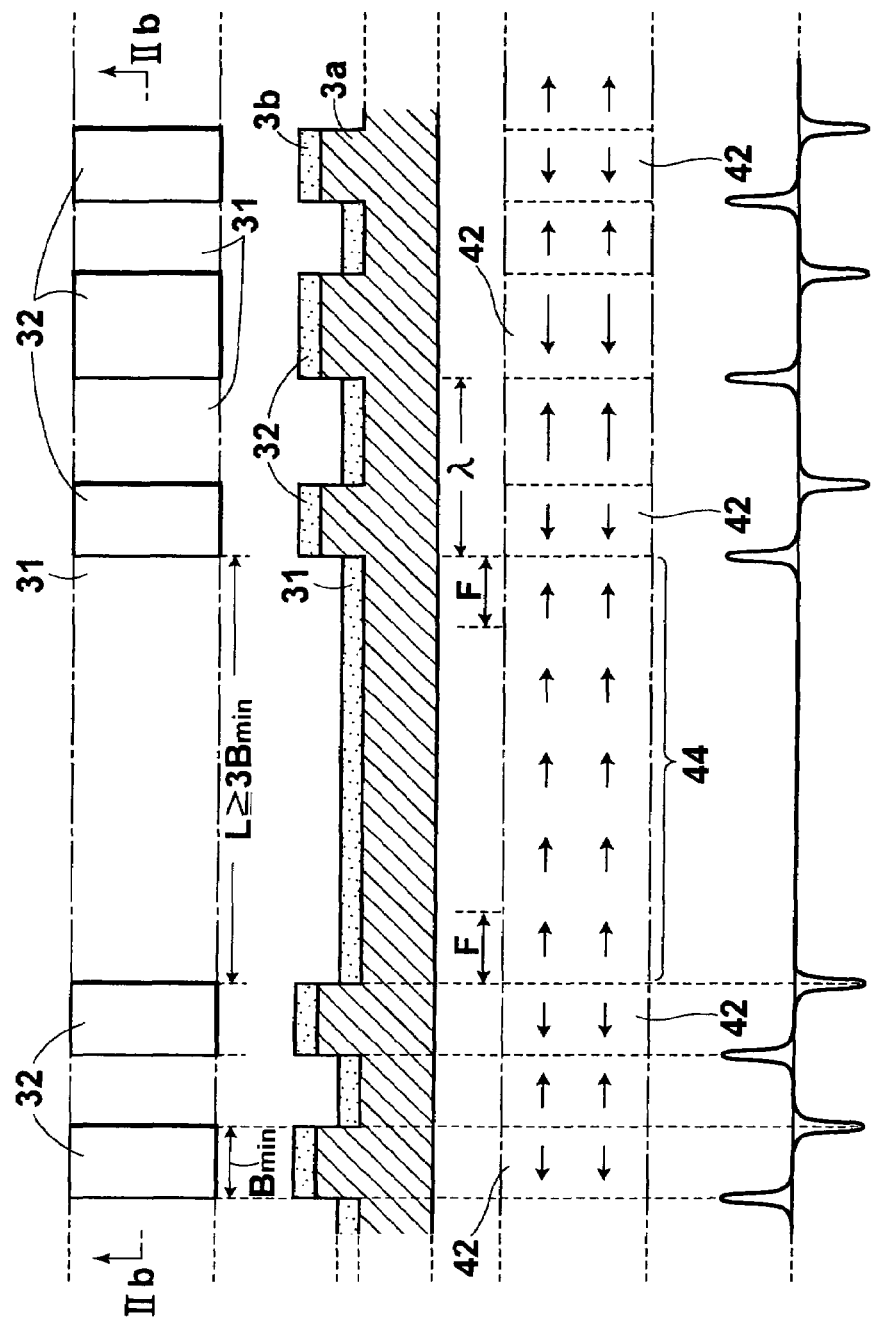
FIG. 2A is a plan view illustrating a part of a track on a master information carrier for magnetic transfer according to the embodiment of the present invention.
FIG. 2B is a partial sectional view illustrating the master information carrier for magnetic transfer.
FIG. 2C is a schematic diagram illustrating magnetized patterns on a magnetic recording medium.
FIG. 2D is a schematic diagram illustrating reproduced waveforms.

FIG. 2A is a plan view illustrating a part of a track on a master information carrier 2 for magnetic transfer. FIG. 2B is a sectional view of the master information carrier 2, taken along line IIb-IIb of FIG. 2A. FIG. 2C is a schematic plan view illustrating magnetized patterns which are formed on a magnetic recording medium by magnetically transferring information from the master information carrier 2. FIG. 2D is a schematic diagram illustrating readout waveforms detected in the magnetized patterns illustrated in FIG. 2C. The waveforms are detected by a reproduction magnetic head by using a signal processing method according to the present invention.

As illustrated in FIGS. 2A and 2B, the master information carrier 2 basically includes a substrate 3a which has uneven patterns on the surface thereof and a magnetic layer 3b. The magnetic layer 3b should be formed at least on the upper surfaces of the protrusions of the uneven patterns. In FIG. 2A, the width of a track is illustrated with dot-dashed lines, and uneven patterns formed in the track are illustrated. Signal uneven patterns which carry signals include depressions 31 and protrusions 32 which are formed in a cycle within a predetermined range. When a minimum bit length is Bmin, a depression 31 which has a length L (L≧3Bmin) with respect to the track direction is provided. The length L is longer than or equal to a length corresponding to three bits.

Magnetized patterns as illustrated in FIG. 2C are magnetically transferred onto the magnetic recording medium from the master information carrier for magnetic transfer, which includes the uneven patterns as illustrated in FIG. 2A, by using a magnetic transfer method which will be described later. Accordingly, the magnetized patterns are recorded on the magnetic recording medium. Reversely magnetized patterns corresponding to the uneven patterns including the depressions 31 and the protrusions 32, which are formed on the surface of the master information carrier 2, are formed on the magnetic recording medium. As will be described later, areas of the magnetic recording medium, which correspond to the depressions 31, are reversely magnetized. Further, areas of the magnetic recording medium, which correspond to the protrusions 32, are magnetized in a direction opposite to that of magnetization of the areas corresponding to the depressions 31. Accordingly, magnetic bits 42 are recorded on the magnetic recording medium, and magnetized patterns are formed on the magnetic recording medium.

For example, when amplitude servo tracking is performed as will be described later, a space 44 in which the magnetic bit 42 is not recorded for a length longer than or equal to a length corresponding to three bits is present between burst areas in which a plurality of magnetic bits 42 is consecutively recorded. Specifically, the space 44 corresponds to the depression 31 which has a length longer than or equal to 3Bmin with respect to the track direction in the signal uneven patterns on the master information carrier 2, illustrated in FIG. 2A. The space 44 is formed by an area which is magnetized in a single direction, and which has a length longer than or equal to 3Bmin with respect to the track direction in the signal magnetized patterns illustrated in FIG. 2C.

As already described with reference to FIGS. 6A through 6C, unclear magnetic recording areas, (which are not illustrated in FIGS. 2A through 2D,) are generated in sub-pulse generation areas F at both ends of the space 44. The unclear magnetic recording areas may cause generation of sub-pulses. However, readout of signals from the sub-pulse generation areas F by the magnetic head (not illustrated) is cancelled in the signal processing method according to the present invention. Therefore, the sub-pulse is not detected.

In the example illustrated in FIGS. 2A through 2D, readout of signals is cancelled by not recognizing the signals which are read out from the sub-pulse generation area F by the magnetic head as reproduced signals. Since the sub-pulse is not detected in the space 44 of the magnetized patterns, the readout waveform is flat, as illustrated in FIG. 2D. Specifically, the readout waveform, as illustrated in FIG. 2D, is detected by the head, and the sub-pulse is not recognized as a reproduced signal in the magnetic record reproduction apparatus.

The sub-pulse generation area F corresponds to an area corresponding to a first half or one bit of the space 44 and/or a last half or one bit of the space 44. Even if an unclear magnetic recording area is generated on the magnetic recording medium 3 during magnetic transfer, influence of generation of the unclear magnetic recording area can be substantially eliminated by canceling readout of signals from the sub-pulse generation area F. Generation of the sub-pulse caused by the unclear magnetic record area is not detected during reproduction of signals. Therefore, it is possible to prevent incorrect recognition of the signals. Here, the sub-pulse generation area F, namely signal readout cancellation area, may be the entire area of the space 44. Particularly, it is preferable that the sub-pulse generation area F includes all of the portions in which sub-pulses are generated because of formation of unclear magnetic recording areas. However, even if the sub-pulse generation area F includes only a part or major part of the portions, a sufficient sub-pulse suppression effect can be achieved.

In the aforementioned embodiment, the signals which are read out from the sub-pulse generation area F are not processed as valid signals. Specifically, readout of the signals is cancelled by not recognizing the signals which are read out from the sub-pulse generation area F as reproduced signals. However, readout of the signals may be cancelled by not reading out the signals from the sub-pulse generation area F by the magnetic head at all.

In these cases, when tracks are scanned by the magnetic head, it is difficult to control readout of signals by the magnetic head to cancel readout of signals from the sub-pulse generation area F while detecting a space 44 which is longer than or equal to a length corresponding to three bits by the same magnetic head. Therefore, a means for detecting a space which is longer than or equal to a length corresponding to three bits may be provided. Further, when the magnetic bits of the servo patterns are recorded on the tracks of the magnetic recording medium 2, the arrangement thereof is known. Therefore, a sub-pulse generation area F may be judged based on recognition that a next space which is longer than or equal to a length corresponding to three bits is present. The judgment of the sub-pulse generation area F may be made by storing the arrangement of the magnetic bits and by referring to the stored arrangement information based on readout of the signals. Accordingly, readout of the signals from the sub-pulse generation area F by the magnetic head is cancelled.

Here, for example, if the signal uneven patterns are servo signals, the cycle λ of the signal uneven patterns is determined based on a signal format which is determined in a servo channel circuit of a magnetic record reproduction apparatus. The magnetic record reproduction apparatus is an apparatus which reproduces data stored in a magnetic recording medium onto which servo patterns are magnetically transferred from a master information carrier.

In the description of the present embodiment, it is assumed that servo signals are magnetically transferred onto the magnetic recording medium, and recorded thereon. However, the signals transferred onto the magnetic recording medium are not limited to the servo signals. Various kinds of data signals may be transferred onto the magnetic recording medium. When a depression which has a length longer than or equal to 3Bmin with respect to the track direction is present in the signal uneven patterns corresponding to desired data, signal processing should be performed to cancel readout of signals from the sub-pulse generation area F.

Next, a magnetic transfer method for transferring information from the master information carrier 3 for magnetic transfer onto the magnetic recording medium 2 will be described.

Figure 3:
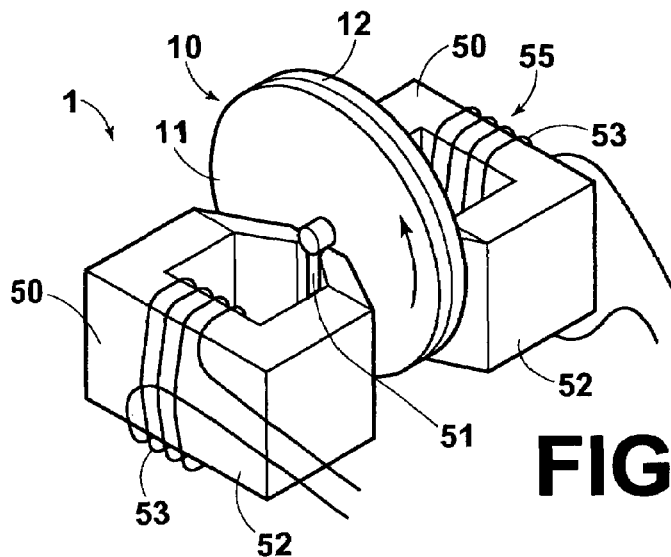
FIG. 3 is a perspective view illustrating the configuration of a magnetic transfer apparatus.

In FIG. 1, the magnetic recording medium 2 and the master information carrier 3 are apart from each other. However, actual magnetic transfer is performed while the recording surface 2b of the magnetic recording medium 2 and the transfer pattern surface of the master information carrier 3 are placed in close contact with each other. FIG. 3 is a perspective view illustrating the schematic configuration of the magnetic transfer apparatus 1.

The magnetic transfer apparatus 1 includes a transfer holder 10 for holding the master information carrier 3 and the magnetic recording medium 2. The magnetic transfer apparatus 1 also includes a pressure means, which is not illustrated. The pressure means presses the transfer holder 10 by applying pressure from both sides thereof so that the master information carrier 3 and the magnetic recording medium 2 are placed in close contact with each other. The magnetic transfer apparatus 1 also includes a magnetic field application means 55. The magnetic field application means 55 applies a magnetic field for transfer while rotating the transfer holder 10.

The magnetic field application means 55 includes electromagnet apparatuses 50 which are arranged at both sides of the transfer holder 10. Further, a coil 53 is wound around the core 52 of each of the electromagnet apparatuses 50. The core 52 has a gap 51 extending in the radial direction of the transfer holder 10. Both of the electromagnet apparatuses 50 generate magnetic fields in the same direction which is parallel with the track direction. Further, the magnetic field application means 55 may be formed by permanent magnet apparatuses instead of the electromagnet apparatuses. If recording is perpendicular recording, the magnetic field application means may be formed by electromagnets or permanent magnets which have different polarities from each other, and which are arranged at both sides of the transfer holder 10. Specifically, the magnetic field for transfer is generated in a direction perpendicular to the track surface in perpendicular recording.

Further, the magnetic field application means 55 is formed so as to allow opening-closing movement of the transfer holder 10. The electromagnet apparatuses 50 at both sides of the transfer holder 10 move so that they are either in or out of contact with the transfer holder 10. Alternatively, either the electromagnet apparatuses 50 or the transfer holder 10 moves so that the transfer holder 10 can be inserted between the electromagnet apparatuses 50.

The transfer holder 10 includes a holder 11 on one side and a holder 12 on the other side. The holder 11 on one side and the holder 12 on the other side can relatively move so that they are either in or out of contact. The transfer holder 10 holds the magnetic recording medium 2 and the master information carrier 3 in an internal space of the transfer holder 10. The magnetic recording medium 2 and the master information carrier 3 are placed in contact with each other so that the center of the magnetic recording medium 2 and that of the master information carrier 3 are at the same position. A support shaft is provided at the center on the back side of each of the holder 11 on one side and the holder 12 on the other side so that the support shaft projects therefrom. The shaft is supported by the apparatus body, and connected to a rotary mechanism. The shaft is driven to rotate the transfer holder during magnetic transfer.

The back side of the master information carrier 3, which is opposite to the transfer pattern surface thereof, is held by the holder 11 on one side. The magnetic recording medium 2 is carried into the holder 11 on one side so that the transfer pattern surface of the master information carrier 3 and the magnetic recording surface of the magnetic recording medium 2 face each other. Then, the holder 12 on the other side is moved close to the holder 11 on one side. Accordingly, the master information carrier 3 and the magnetic recording medium 2 are held between both of the holders 11 and 12. Both of the holders 11 and 12 are pressed from the back sides thereof by a pressure means, which is not illustrated. The holders 11 and 12 hold the master information carrier 3 and the magnetic recording medium so that they are in close contact with each other.

Next, a magnetic transfer method by the magnetic transfer apparatus 1 will be described. The transfer holder 10 of the magnetic transfer apparatus 1 is used to magnetically transfer information from a pair of master information carriers 3 onto a plurality of magnetic recording media 2. First, the master information carrier 3 is held by the holder 11 on one side so that the master information carrier 3 is placed at an appropriate position of the holder 11 on one side. Then, while the holder 11 on one side and the holder 12 on the other side are placed apart from each other, a magnetic recording medium 2 which has been initially magnetized in advance in one of an in-plane direction and a perpendicular direction is set so that the center thereof is placed at the same position as that of the master information carrier 3. Then, the holder 12 on the other side is moved close to the holder 11 on one side. The magnetic recording medium 2 and the master information carrier 3 are housed in the transfer holder 10 so that they are held from both sides thereof. Both of the holders 11 and 12 of the transfer holder 10 are pressed by the pressure means by applying pressure from the backsides thereof. The magnetic recording medium 2 and the master information carrier 3 are evenly pressed, and placed in close contact with each other.

Then, the electromagnet apparatuses 50 are moved close to both sides of the transfer holder 10. A magnetic field for transfer is applied by the electromagnet apparatuses 50 in a direction approximately opposite to that of initial magnetization while the transfer holder 10 is rotated. Accordingly, magnetized patterns corresponding to transfer patterns of the master information carrier 3 are transferred onto the magnetic recording layer of the magnetic recording medium 2, and recorded thereon.

Figure 4A:
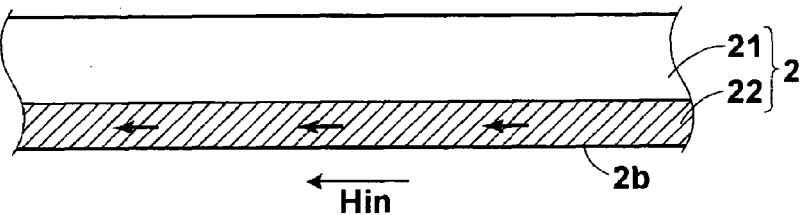
FIG. 4A is a diagram illustrating the process of magnetic transfer.
Figure 4B:
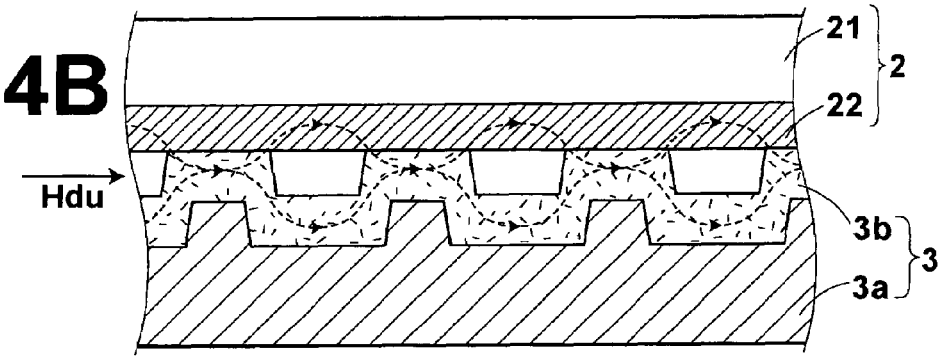
FIG. 4B is a diagram illustrating the process of magnetic transfer.
Figure 4C:
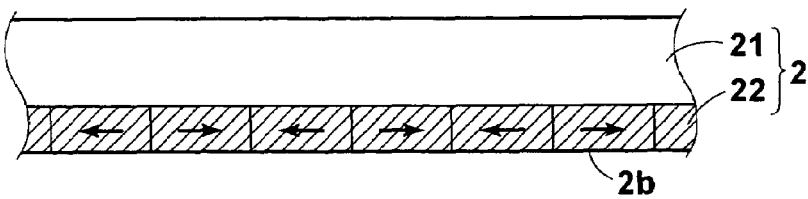
FIG. 4C is a diagram illustrating the process of magnetic transfer.

FIGS. 4A through 4C are diagrams for explaining a basic process for magnetically transferring information onto an in-plane magnetic recording medium, which is the magnetic recording medium 2. FIG. 4A is a diagram illustrating the process of performing initial direct current magnetization on the magnetic recording medium by applying a magnetic field in a single direction. FIG. 4B is a diagram illustrating the process of applying a magnetic field in a direction which is approximately opposite to that of the initial direct current magnetic field while the master information carrier and the magnetic recording medium are placed in close contact with each other. FIG. 4C is a diagram illustrating the state of the record reproduction surface of the magnetic recording medium after magnetic transfer.

As illustrated in FIG. 4A, a magnetic field H of initial direct current magnetization is applied to the magnetic recording medium 2 in advance in a single direction along the track so that the magnetic recording layer 22 is initially magnetized with direct current. Then, as illustrated in FIG. 4B, the recording surface 2b of the magnetic recording medium 2 and the transfer pattern surface of the master information carrier 3 are placed in close contact with each other. Then, a magnetic field Hdu for transfer is applied in a track direction of the magnetic recording medium 2. The direction of the magnetic field Hdu is opposite to that of the magnetic field Hin of the initial direct current magnetization. The magnetic field Hdu for transfer is absorbed in the protrusions of the master information carrier 3 at points where the magnetic recording medium 2 and the master information carrier 3 are placed in close contact with each other. Therefore, magnetization of the magnetic recording medium 2, which corresponds to this area, is not reversed, and initial magnetization in other areas is reversed. Consequently, as illustrated in FIG. 4C, information (for example, servo signals) corresponding to uneven patterns on the master information carrier 3 is magnetically transferred onto the magnetic recording layer 22 on the lower recording surface 2b of the magnetic recording medium 2, and recorded thereon.

After the magnetic transfer process is performed, the uneven patterns on the surface of the master information carrier 3, as illustrated in FIG. 2A, are transferred onto the magnetic recording medium 2, and the magnetized patterns as illustrated in FIG. 2C are recorded thereon.

In this embodiment, the magnetic recording medium 2 has a magnetic recording surface only on one side thereof. However, a magnetic recording medium which has magnetic recording surfaces on both sides thereof may be used. When the magnetic recording medium which has magnetic recording surfaces on both sides thereof is used, information may be magnetically transferred onto both of the recording surfaces of the magnetic recording medium 2 at the same time. Alternatively, information may be magnetically transferred onto each of the recording surfaces of the magnetic recording medium 2 one by one.

It is necessary that the initial direct current magnetic field and the magnetic field for transfer are generated by adopting values which are determined based on the coercivity of the magnetic recording medium, relative permeability of the master information carrier and magnetic recording medium, or the like.

Figure 5:
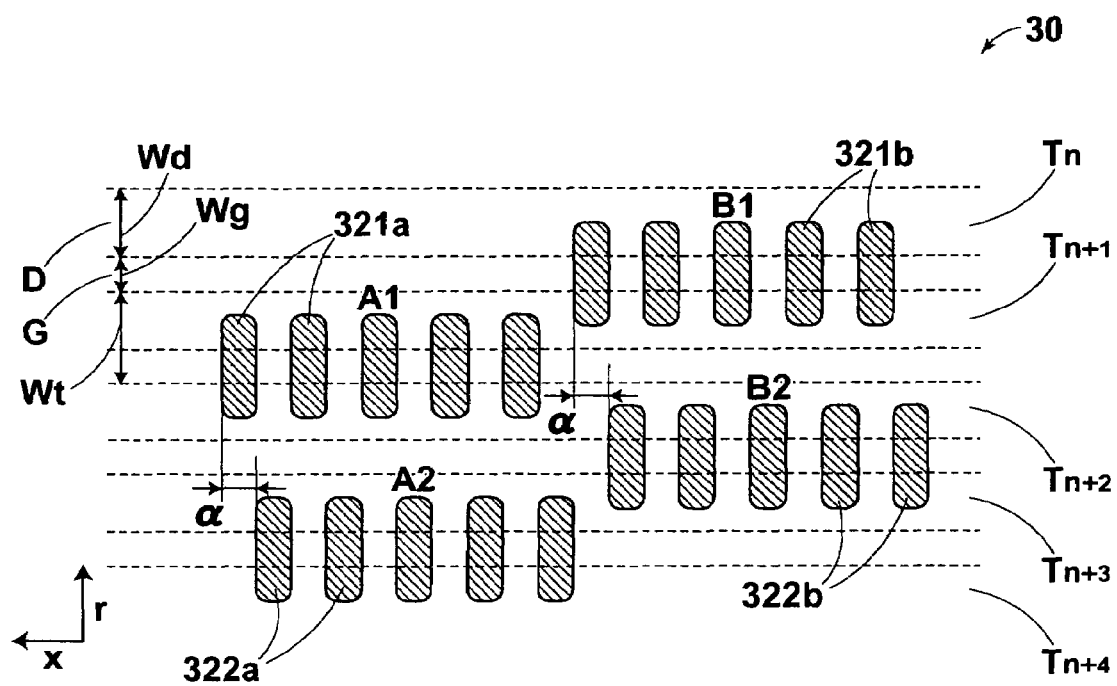
FIG. 5 is a partially enlarged plan view illustrating the master information carrier for magnetic transfer.

Next, magnetic transfer of amplitude servo patterns will be described with reference to FIG. 5. FIG. 5 is a partially enlarged plan view of the master information carrier 3. Uneven patterns 30 (servo transfer patterns) corresponding to the amplitude servo patterns, in other words, servo signals, which will be recorded on the magnetic recording medium 2 are formed on the master information carrier 3.

The uneven patterns 30 for amplitude servo tracking are recorded in tracks Tn which are concentrically or spirally formed. If the recording medium is a magnetic recording medium, the amplitude servo signals are recorded in servo areas P of the magnetic recording medium. The servo areas P are formed in narrow areas which substantially radially extend from the center of the magnetic recording medium at the same intervals. The amplitude servo signals are used in servo tracking by the magnetic head during reproduction.

The tracks Tn are formed so that data tracks D and guard bands G are sequentially arranged so that they are adjacent to each other in the width direction r of the tracks. A width Wt is the sum of the width Wd of the data track D and the width Wg of the guard band G, and the width Wt corresponds to a so-called track pitch. Here, it is preferable that the track pitch Wt is less than or equal to approximately 200 nm.

The uneven patterns 30 for amplitude servo tracking are formed by burst bit signals for controlling positions using reproduced amplitude servo signals. The burst bit signals include bursts A, B, C and D which are sequentially formed in the track direction. In FIG. 5, only A-burst bit strings A1 and A2 and B-burst bit strings B1 and B2 which are recorded on a part of four tracks Tn+1 through Tn+4 are illustrated. The A-burst bit strings A1 and A2 form the burst A, and the B-burst bit strings B1 and B2 form the burst B. Each of the burst bit strings A1, A2, B1 and B2 includes a plurality of rectangular burst bit elements 321a, 322a, 321b or 322b, respectively. Each of the plurality of rectangular burst bit elements 321a, 322a, 321b or 322b is arranged in a string.

In the magnetized patterns on the magnetic recording medium 2, the shaded areas illustrated in FIG. 5 are magnetic bits 42.

The recorded area of each of the A-burst bit strings A1 and A2 and B-burst bit strings B1 and B2 is located in the area from an approximate center of a data track D with respect to the width direction of the track to an approximate center of an adjacent data track D with respect to the width direction of the track. The A-burst bit strings A1 and A2 and the B-burst bit strings B1 and B2 are alternately recorded in the width direction r of the track. Further, a C-burst bit string and a D-burst bit string, which are not illustrated, and which form the bursts C and D, include burst bits similar to those in the A-burst bit string and the B-burst bit string. The recorded area of one of the C-burst bit string and the D-burst bit string is positioned at an odd-numbered track, and that of the other bit string is positioned at an even-numbered track. Each of the C-burst bit string and D-burst bit string is recorded in an area which has a length of approximately one track pitch Wt with the center thereof at the center of a data track D with respect to the width direction of the track.

If the uneven patterns 30 for amplitude servo tracking on the master information carrier, illustrated in FIG. 5, are used to explain the magnetic patterns of the magnetic recording medium 2 onto which the uneven patterns 30 for amplitude servo tracking are transferred, the magnetic head is positioned on the data track D by servo tracking so that the magnetic head can read data on the data track D. Generally, the length of the magnetic head with respect to the width direction of the track is shorter than the width Wd of the data track. In FIG. 5, the arrow x represents the track direction, and the arrow r represents the width direction of the track. The arrow r is the same as the radial direction of the magnetic disk medium.

The A-burst bit string A1 and the B-burst bit string B2 are used to position the magnetic head on the second track Tn+2. The A-burst bit string A1 is formed in an area which straddles a line between the first track Tn+1 and the second track Tn+2, and the B-burst bit B2 is formed in an area which straddles a line between the second track Tn+2 and the third track Tn+3. The A-burst bit string A1, which is recorded in an area which straddles a line between the first track Tn+1 and the second track Tn+2, is used to position the magnetic head on the first track Tn+1. Meanwhile, The B-burst bit string B2, which is recorded in an area which straddles a line between the second track Tn+2 and the third track Tn+3, is used to position the magnetic head on the third track Tn+3.

When the magnetic head scans the second track Tn+2, positional servo tracking is performed so that reproduction amplitudes from both the A-burst bit string A1 and the B-burst bit string B2 are similar to each other, and the magnetic head is positioned on the second track Tn+2.

When the amplitude servo tracking is performed as described above, the A-burst bit string A1, which is recorded in an area which straddles a line between the first track Tn+1 and the second track Tn+2, and the A-burst bit string A2, which is recorded in an area which straddles a line between the third track Tn+3 and the fourth track Tn+4, are recorded so that they are adjacent to each other with respect to the width direction r of the tracks. They are recorded so that the interval (non-signal area corresponding to the aforementioned space 44) therebetween is approximately one track pitch width Wt. The A-burst bit strings A1 and A2 are arranged so that the phases thereof with respect to the track direction x (rotation direction of the magnetic disk) are different from each other. In the case illustrated in FIG. 5, the A-burst bit strings A1 and A2 are arranged so that the phases thereof are shifted from each other by an amount α, which corresponds to the width of a single burst bit in the direction x. The B-burst bit strings B1 and B2 which are adjacent to each other are arranged in a similar manner to the A-burst bit strings A1 and A2 so that the phases thereof are shifted from each other by an amount α. When the B-burst bits are adjacent to each other with an interval corresponding to one track pitch width Wt, the B-burst bit strings B1 and B2 are arranged so that the phases of burst bits of the B-burst bit string B1 and those of the B-burst bit string B2 are shifted from each other by the amount α.

As described above, in each of the A-burst bit strings, B-burst bit strings, C-burst bit strings, and D-burst bit strings, the phases of the burst bit strings which are adjacent to each other with respect to the width direction r of the track are shifted from each other (for example, the phases are shifted from each other between the burst bit string A1 and the burst bit string A2 in the A-burst bit string). When a magnetic field for magnetic transfer is applied to the burst bit elements 321a and the burst bit elements 322a which are arranged on the master information carrier 3 as described above to perform amplitude servo tracking, each of the burst bit elements is magnetized. Accordingly, both ends of each of the elements with respect to the track direction x are magnetized to have positive polarity and negative polarity, respectively. Since the phases are different from each other between the burst bit element 321a and the burst bit element 322a which are adjacent to each other with respect to the width direction r of the track, a magnetic field which spreads from the burst bit element 321a and a magnetic field which spreads from the burst bit element 322a cancel out each other. Therefore, a magnetic field is not detected. Hence, a noise is not detected, and it is possible to perform accurate tracking of the magnetic head.

The shift amount α of the phase is set so that the positions of the ends of the burst bit elements with respect to the track direction x are shifted from each other. In other words, the shift amount α is set so that the polarities of the magnetic fields are shifted from each other. In the example illustrated in FIG. 5, the shift amount α is set so that the phases are shifted by 180 degrees (namely, one bit length) to satisfy an optimal condition. Accordingly, the polarities are completely opposite to each other. However, even if the phase is shifted by an amount which is smaller than 180 degrees, a sufficient effect can be achieved. Specifically, when the phase is shifted by an amount in a range of between 90 degrees through 180 degrees, an advantageous effect can be achieved.

In the amplitude servo pattern 10, the C-burst bit strings and D-burst bit strings are not illustrated. However, the C-burst bit strings and D-burst bit strings may be also arranged in a similar manner to the A-burst bit strings and B-burst bit strings. The C-burst bit strings and D-burst bit strings may be arranged based on the shift amount of the phase in the A-burst bit strings and B-burst bit strings. The C-burst bit strings and D-burst bit strings may be arranged so that the phases of the bit strings which are adjacent to each other with an interval corresponding to one track pitch width Wt are shifted from each other. The adjacent bit strings are arranged so that the polarities thereof are different from each other. For example, the adjacent bit strings may be positioned so that they are shifted from each other by the amount α.

Further, in FIG. 2, the element shape of the magnetic bit 42 is rectangular. However, when the bit element has a shape having rounded portions at both ends (corners) thereof with respect to the width direction of the track, as illustrated in FIG. 5, bit elements which have uniform edge qualities can be produced. The shape as illustrated in FIG. 5 is preferable because the magnitude of magnetic field that spreads from the magnetic bit 42 to the area surrounding the magnetic bit 42 is small. Further, the element shape may be a parallelogram which inclines with respect to the width direction r of the track.

As illustrated in FIG. 5, the bit elements may be formed so that the length of the record area of each of the A-burst bit string and the B-burst bit string with respect to the width direction r of the track is longer than the track pitch Wt. Further, the bit elements may be formed so that when the record areas of both of the A-burst bit string and the B-burst bit string are viewed from the track direction x, the record area of the A-burst bit string and that of the B-burst bit string overlap each other with respect to the width direction r of the track at the central part of the data track D with respect to the width direction of the track.

In this case, each burst bit element is recorded beyond the center of the data track D with respect to the width direction of the track. Therefore, the amplitude of reproduced signals can be increased when compared with the case of recording a burst bit in an area which has approximately the same length as the track pitch Wt.

Further, the ratio (aspect ratio) of the length of each bit (element) in the burst bit string with respect to the width direction r of the track to the length thereof with respect to the track direction x is less than or equal to 2. When amplitude servo patterns are formed, the lengths of servo burst signals with respect to the track direction are different from each other between the inner circumference and the outer circumference of the servo area P. The length at the outer circumference is longer than the length at the inner circumference. Therefore, the aspect ratio at the outer circumference is smaller than the aspect ration at the inner circumference. The aspect ratio is smaller than or equal to 2 in the outer circumference. If a burst bit element has a small aspect ratio, when a magnetic field spreads from the burst bit element to the area surrounding the burst bit element, the magnetic field forms a large arc, and noise increases. Therefore, when elements which have aspect ratios smaller than or equal to 2 are formed, if the elements are arranged so that the phases are shifted from each other, the noise can be efficiently reduced. Accordingly, it is possible to detect reproduced signals, and a servo mechanism can be secured.

The magnetic record reproduction apparatus (not illustrated) which uses the magnetic recording medium 2 on which the servo signals are recorded includes a magnetic head. The magnetic record reproduction apparatus also includes a magnetic recording medium which is preformatted, and which is placed to face the magnetic head, a drive means for driving the magnetic head, and a drive means for driving the magnetic recording medium. The magnetic record reproduction apparatus also includes a recorded reproduction signal processing means for processing signals by exchanging signals with the magnetic head.

The preformat of the magnetic recording medium includes amplitude servo patterns including servo burst signals represented by burst bit strings. The burst bit strings are arranged so that they are adjacent to each other with respect to the width direction of the track. When signals are read out, readout of signals from the sub-pulse generation area F is cancelled. Therefore, low-noise signals are reproduced, and the amplitude of the reproduced signals can be increased. Accordingly, accurate positional servo tracking can be performed.

The substrate 3a of the master information carrier 3 may be made of Ni, silicon, quartz, glass, aluminum, ceramic, synthetic resin, or the like. However, it is particularly preferable that the substrate 3a is made of Ni or Ni-based alloy.

As the magnetic material of the magnetic layer 3b, Co, Co alloy (CoNi, CoNiZr, CoNbTaZr, or the like), Fe, Fe alloy (FeCo, FeCoNi, FeNiMo, FeAlSi, FeAl, and FeTaN), Ni, or Ni alloy (NiFe) may be used. Preferably, the magnetic material is FeCo or FeCoNi, and Fe70Co30 is most preferable. If the magnetic layer 3b provided on the substrate 3a is made of a soft magnetic material, semi-hard magnetic material, or the like, which has low coercivity, magnetic transfer can be performed more efficiently. Further, it is preferable that the magnetic layer is made of a material which has a saturated magnetization value higher than that of the substrate.

The substrate 3a which bears uneven patterns on the surface thereof may be produced by a stamper method, photolithography method, or the like. An example of a production process of a patterned master information carrier 3 will be described. First, a first original disk which bears uneven patterns corresponding to signal patterns (including reversed patterns of the uneven patterns having protrusions and depressions) on the surface thereof is produced. Then, the patterned master information carrier 3 can be produced using the first original disk. The patterned master information carrier 3 can be produced by using a method for producing a metal plate which bears uneven patterns on the surface thereof by electric forming.

The first original disk which bears uneven patterns on the surface thereof may be produced by using a photolithography method or the like. A method for producing an original disk using a silicon wafer will be described. However, a quartz plate or a glass plate may be used instead of the silicon wafer.

First, a positive-type electronic beam resist layer is provided, by spin-coating, or the like, on a disk-shaped silicon wafer which has a smooth surface. The resist layer is irradiated with an electronic beam modulated according to the signal patterns while the silicon wafer is rotated. Accordingly, the entire surface of the resist layer is irradiated in the shape of signal patterns. For example, if the signal patterns are servo signals which are used in magnetic disks, a plurality (for example, 200) of sectors is provided on each of a multiplicity (for example, several tens of thousands) of tracks which are concentrically formed at regular intervals. Patterns corresponding to the servo signals which extend in the circumferential direction of the track are formed in a part of each of the sectors by irradiation. After the entire surface of the resist is irradiated in the shape of signal patterns, as described above, the resist is developed, and the resist which has been irradiated with the electronic beam is removed from the surface of the silicon wafer. Accordingly, protrusions are formed with the resist, and depressions are formed by the surface of the silicon wafer, which is exposed by removing the irradiated portion of the resist. In this way, a silicon wafer which bears uneven patterns on the surface thereof, namely the first original disk, is produced.

Then, electroforming is performed using the first original disk which has been produced as described above. Specifically, a thin conductive layer is formed on the surface of the uneven patterns on the surface of the first original plate by depositing a metal such as nickel, silver, or the like by sputtering, vapor-deposition, or electroless plating, if necessary. Then, electroplating is performed so that the thickness of Ni is sufficiently greater than the height of the protrusions. Then, Ni which is formed by electroplating is peeled off from the first original plate. Accordingly, a Ni plate (hereinafter, referred to as the first mold) which bears uneven patterns is produced. The uneven patterns include protrusions which are formed by the portions irradiated with the electronic beam. The first mold which is produced in this way is used as the patterned master information carrier. Alternatively, a magnetic layer 3b and a protective layer are further formed sequentially on the surface of the uneven patterns, and the first mold on which the magnetic layer 3b and the protective layer are formed is used as the patterned master information carrier after.

Alternatively, the first mold may be used as a second original disk, and electroforming may be further performed on the first mold to produce a Ni plate (hereinafter, referred to as a second mold) which bears uneven patterns on the surface thereof. The second mold may be used as the patterned master information carrier. Alternatively, a magnetic layer 3b and a protective layer may be further formed sequentially on the surface of the uneven patterns, and the second mold on which the magnetic layer 3b and the protective layer are formed may be used as the patterned master information carrier after. In this case, when the first original disk is produced, it is preferable that (1) a negative-type electronic beam resist is used, and the resist is irradiated with an electronic beam in the shape of signal patterns corresponding to servo signals, or (2) a positive-type electronic beam resist is used, and the resist is irradiated with the electronic beam in the shape of the reversed patterns of the signal patterns corresponding to the servo signals. The advantageous effect of the present invention is that a plurality of patterned master information carriers can be produced from the second original disk.

Further, the second original disk may be used as a stamper, and a disk made of resin, which bears uneven patterns on the surface thereof, may be produced by using a stamper method. Further, a magnetic layer 3b and a protective layer may be sequentially formed on the surface of the uneven patterns of the disk to produce a master information carrier.

Meanwhile, after the first original disk is produced in a similar manner to the aforementioned method, if etching processing is performed on the surface of the first original disk, the resist which forms the protrusions functions as an etching resist. Therefore, etching can be selectively performed on the surface of the silicon wafer, which corresponds to the depressions. After etching is performed as described above, the resist which forms the protrusions are removed. Accordingly, a third original disk which bears uneven patterns on the surface of the silicon wafer is produced. When electroforming is performed using the third original disk in a manner similar to the aforementioned method, a Ni plate (third mold) which bears uneven patterns on the surface thereof may be produced. The third mold may be used as the master information carrier. Alternatively, a magnetic layer 3b and a protective layer may be sequentially formed on the surface of the uneven patterns, and the third mold on which the magnetic layer 3b and the protective layer are formed may be used as the master information carrier. In this case, a plurality of master information carriers can be also produced from the third original disk.

It is preferable that the height of the protrusions (depth of the uneven patterns) of the master information carrier 3 is within the range of 20 nm through 500 nm. It is more preferable that the height is within the range of 40 nm through 100 nm. If the uneven patterns are sample servo signals, protrusions which have rectangular shapes are formed. The rectangular shapes are formed so that the length with respect to the radial direction of the disk is longer than the length with respect to the circumferential direction of the disk, namely the track direction.

The magnetic layer 3b is formed on the uneven patterns of the substrate by depositing a magnetic material by using a vacuum deposition method such as a vacuum vapor deposition method, sputtering method, and ion plating method or a plating method such as electric plating and electroless plating, or the like. It is preferable that the thickness of the magnetic layer 3b (thickness of the magnetic layer on the surfaces of the protrusions) is within the range of 20 nm through 500 nm. Further, it is more preferable that the thickness is within the range of 30 nm through 100 nm.

Further, it is preferable that a protective layer made of carbon or diamond-like carbon (DLC) which has a thickness of 3 nm through 30 nm is provided on the magnetic layer 3b on the surfaces of the protrusions. Further, a lubricant layer may be also provided. Further, a layer made of Si or the like may be provided between the magnetic layer 3b and the protective layer to increase the adhesion therebetween. When the position of the master information carrier is shifted because of contact with the magnetic recording medium, the master information carrier might be scratched in the process of correcting the shift in the position. However, if the lubricant layer is provided, it is possible to prevent generation of scratches on the surface of the master information carrier due to friction between the master information carrier and a magnetic recording medium. Accordingly, the durability of the master information carrier can be further increased.

The structures of the magnetic recording medium 2 and the master information carrier 3 are not limited to those described in the embodiments of this invention. The advantage effects of the present invention can be achieved as far as signals are read out from a magnetic recording medium on which magnetized patterns including a space 44, in which a sub-pulse is generated, are formed.

What is claimed is:

1. A signal processing method of a magnetic recording medium in readout of signals by a magnetic head from the magnetic recording medium on which magnetic bits corresponding to information are recorded along the tracks thereof by using a magnetic transfer method, wherein if a space which is longer than or equal to a length corresponding to three bits is present between consecutive magnetic bits, readout of signals from a sub-pulse generation area in the space is cancelled in readout of the magnetic bits along the tracks by the magnetic head.

2. A signal processing method as defined in claim 1, wherein readout of signals from an area corresponding to a first half or one bit of the space and/or a last half or one bit of the space is cancelled in readout of the magnetic bits.

3. A signal processing method as defined in claim 1, wherein the information recorded on the magnetic recording medium is burst bit signals which are used in amplitude servo tracking.

4. A signal processing method as defined in claim 2, wherein the information recorded on the magnetic recording medium is burst bit signals which are used in amplitude servo tracking.

5. A magnetic record reproduction apparatus comprising:
a servo tracking means for performing servo tracking on a magnetic recording medium by using a signal processing method of a magnetic recording medium in readout of signals by a magnetic head from the magnetic recording medium on which magnetic bits corresponding to information are recorded along the tracks thereof by using a magnetic transfer method, wherein if a space which is longer than or equal to a length corresponding to three bits is present between consecutive magnetic bits, readout of signals from a sub-pulse generation area in the space is cancelled in readout of the magnetic bits along the tracks by the magnetic head.

6. A magnetic record reproduction apparatus as defined in claim 5, wherein the magnetic recording medium is a recording medium on which signals are magnetically transferred from a master information carrier for magnetic transfer, on which bit elements having rounded portions at both ends thereof with respect to the width direction of the tracks are formed along the tracks.

7. A magnetic record reproduction apparatus as defined in claim 5, wherein the magnetic bits recorded along the tracks are burst signals which are used in amplitude servo tracking, and wherein the burst signals are recorded so that the ends of the burst signals with respect to the width direction of the track, which are adjacent to each other with respect to the direction of the track, overlap with each other.

8. A magnetic record reproduction apparatus as defined in claim 6, wherein the magnetic bits recorded along the tracks are burst signals which are used in amplitude servo tracking, and wherein the burst signals are recorded so that the ends of the burst signals with respect to the width direction of the track, which are adjacent to each other with respect to the direction of the track, overlap with each other.

9. A magnetic record reproduction apparatus as defined in claim 5, wherein the magnetic bits recorded along the tracks are burst signals which are used in amplitude servo tracking, and wherein the burst signals which are adjacent to each other with respect to the width direction of the track are recorded so that the phases of the magnetic bits thereof are shifted from each other.

10. A magnetic record reproduction apparatus as defined in claim 6, wherein the magnetic bits recorded along the tracks are burst signals which are used in amplitude servo tracking, and wherein the burst signals which are adjacent to each other with respect to the width direction of the track are recorded so that the phases of the magnetic bits thereof are shifted from each other.

11. A magnetic record reproduction apparatus as defined in claim 7, wherein the magnetic bits recorded along the tracks are burst signals which are used in amplitude servo tracking, and wherein the burst signals which are adjacent to each other with respect to the width direction of the track are recorded so that the phases of the magnetic bits thereof are shifted from each other.

12. A magnetic record reproduction apparatus as defined in claim 8, wherein the magnetic bits recorded along the tracks are burst signals which are used in amplitude servo tracking, and wherein the burst signals which are adjacent to each other with respect to the width direction of the track are recorded so that the phases of the magnetic bits thereof are shifted from each other.

13. A magnetic record reproduction apparatus comprising:
a servo tracking means for performing servo tracking on a magnetic recording medium by using a signal processing method of a magnetic recording medium in readout of signals by a magnetic head from the magnetic recording medium on which magnetic bits corresponding to information are recorded along the tracks thereof by using a magnetic transfer method, wherein if a space which is longer than or equal to a length corresponding to three bits is present between consecutive magnetic bits, readout of signals from an area corresponding to a first half or one bit of the space and/or a last half or one bit of the space is cancelled in readout of the magnetic bits along the tracks by the magnetic head.

14. A magnetic record reproduction apparatus as defined in claim 13, wherein the magnetic recording medium is a recording medium on which signals are magnetically transferred from a master information carrier for magnetic transfer, on which bit elements having rounded portions at both ends thereof with respect to the width direction of the tracks are formed along the tracks.

15. A magnetic record reproduction apparatus as defined in claim 13, wherein the magnetic bits recorded along the tracks of the magnetic recording medium are burst signals which are used in amplitude servo tracking, and wherein the burst signals are recorded so that the ends of the burst signals with respect to the width direction of the track, which are adjacent to each other with respect to the direction of the track, overlap with each other.

16. A magnetic record reproduction apparatus as defined in claim 14, wherein the magnetic bits recorded along the tracks of the magnetic recording medium are burst signals which are used in amplitude servo tracking, and wherein the burst signals are recorded so that the ends of the burst signals with respect to the width direction of the track, which are adjacent to each other with respect to the direction of the track, overlap with each other.

17. A magnetic record reproduction apparatus as defined in claim 13, wherein the magnetic bits recorded along the tracks of the magnetic recording medium are burst signals which are used in amplitude servo tracking, and wherein the burst signals which are adjacent to each other with respect to the width direction of the track are recorded so that the phases of the magnetic bits thereof are shifted from each other.

18. A magnetic record reproduction apparatus as defined in claim 14, wherein the magnetic bits recorded along the tracks of the magnetic recording medium are burst signals which are used in amplitude servo tracking, and wherein the burst signals which are adjacent to each other with respect to the width direction of the track are recorded so that the phases of the magnetic bits thereof are shifted from each other.

19. A magnetic record reproduction apparatus as defined in claim 15, wherein the magnetic bits recorded along the tracks of the magnetic recording medium are burst signals which are used in amplitude servo tracking, and wherein the burst signals which are adjacent to each other with respect to the width direction of the track are recorded so that the phases of the magnetic bits thereof are shifted from each other.

20. A magnetic record reproduction apparatus as defined in claim 16, wherein the magnetic bits recorded along the tracks of the magnetic recording medium are burst signals which are used in amplitude servo tracking, and wherein the burst signals which are adjacent to each other with respect to the width direction of the track are recorded so that the phases of the magnetic bits thereof are shifted from each other.

* * * * *